(12) United States Patent
Matsushima

(10) Patent No.: US 10,195,973 B2
(45) Date of Patent: Feb. 5, 2019

(54) VEHICLE STRUCTURE BODY

(71) Applicant: TOYOTA BOSHOKU KABUSHIKI KAISHA, Aichi-ken (JP)

(72) Inventor: Iwao Matsushima, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/623,953

(22) Filed: Jun. 15, 2017

(65) Prior Publication Data
US 2018/0022258 A1 Jan. 25, 2018

(30) Foreign Application Priority Data
Jul. 19, 2016 (JP) .................................. 2016-141374

(51) Int. Cl.
| | |
|---|---|
| *B60N 2/80* | (2018.01) |
| *B60N 2/68* | (2006.01) |
| *B60N 2/58* | (2006.01) |
| *B60N 2/64* | (2006.01) |
| *B60N 2/60* | (2006.01) |
| *B60N 2/70* | (2006.01) |

(52) U.S. Cl.
CPC ............... *B60N 2/682* (2013.01); *B60N 2/58* (2013.01); *B60N 2/6009* (2013.01); *B60N 2/643* (2013.01); *B60N 2/68* (2013.01); *B60N 2/70* (2013.01); *B60N 2/80* (2018.02)

(58) Field of Classification Search
CPC .. B60N 2/1842; B60N 2/1892; B60N 2/1896; B60N 2/22; B60N 2/242; B60N 2/245; B60N 2/28; B60N 2/2812

USPC .......... 296/63, 64, 65.01, 69, 204, 104, 209, 296/210, 68, 99.1; 297/452.18, 182, 297/217.3, 129, 214, 232, 395, 408, 465, 297/468; 248/503.1, 503; 701/49, 36, 701/37, 45, 48
See application file for complete search history.

(56) References Cited

U.S. PATENT DOCUMENTS

| | | | | | |
|---|---|---|---|---|---|
| 5,713,634 | A | * | 2/1998 | Koike .................... | B60N 2/643 297/378.13 |
| 6,007,154 | A | * | 12/1999 | Parker ................... | B60N 2/809 297/410 |

(Continued)

FOREIGN PATENT DOCUMENTS

JP 6-154061 6/1994

*Primary Examiner* — D Glenn Dayoan
*Assistant Examiner* — Sunsurraye Westbrook
(74) *Attorney, Agent, or Firm* — Greenblum & Bernstein, P.L.C.

(57) ABSTRACT

A vehicle structure body includes: a vehicle interior member; an exterior member; and a fastening portion in which a first fastening seat of the vehicle interior member and a second fastening seat of the exterior member are fastened and fixed to each other in a state of being disposed to face each other. A first fastening part to which a first fastener is attached with a shaft portion of the first fastener, and a second fastening part to which a second fastener is attached with a shaft portion of the second fastener are provided adjacent to each other. An input direction of a shear load that is applied to the shaft portion of the first fastener in an orthogonal direction and an input direction of a shear load that is applied to the shaft portion of the second fastener in an orthogonal direction differ from each other.

6 Claims, 14 Drawing Sheets

(56) References Cited

U.S. PATENT DOCUMENTS

| | | | | |
|---|---|---|---|---|
| 6,022,078 | A * | 2/2000 | Chang | B60N 2/868 |
| | | | | 297/391 |
| 6,499,786 | B2 * | 12/2002 | Takahashi | B60N 2/28 |
| | | | | 280/801.1 |
| 7,975,360 | B2 * | 7/2011 | Veine | B60N 2/888 |
| | | | | 29/453 |
| 8,550,561 | B2 * | 10/2013 | Ikeya | B60N 2/847 |
| | | | | 297/410 |
| 8,939,513 | B2 * | 1/2015 | Holmes | B60N 2/487 |
| | | | | 297/408 |
| 8,979,205 | B2 * | 3/2015 | Zimmermann | B60N 2/682 |
| | | | | 297/452.18 |
| 2003/0062230 | A1 * | 4/2003 | Maeno | F16F 7/108 |
| | | | | 188/379 |
| 2016/0031346 | A1 * | 2/2016 | Mildner | B60N 2/809 |
| | | | | 296/64 |

* cited by examiner

VEHICLE STRUCTURE BODY

INCORPORATION BY REFERENCE

The disclosure of Japanese Patent Application No. 2016-141374 filed on Jul. 19, 2016 including the specification, drawings and abstract is incorporated herein by reference in its entirety.

BACKGROUND

1. Technical Field

The disclosure relates to a vehicle structure body including a vehicle interior member and an exterior member fastened and fixed to the vehicle interior member.

2. Description of Related Art

As this type of vehicle structure body, a vehicle seat is disclosed in Japanese Patent Application Publication No. 06-154061 (JP 06-154061 A). The vehicle seat is a wide seat on which a plurality of people can sit, and includes a seat frame and a plurality of cushions. The seat frame is a member forming the skeleton of the seat, and a shell formed of a plate member having a generally L-shape in side view is fixed on the seating side of the seat frame. Each cushion is a member formed by integrating a skin, a pad, and a backing member together and forms a portion that serves as a seating surface of the seat. Each cushion is provided at its upper end with a plurality of hooks, and these hooks are arranged side by side at appropriate intervals in a seat width direction. The shell is also provided with a plurality of hooks that correspond to the hooks on the cushion side. The hooks on the shell side are arranged at appropriate intervals on the same plane of the shell in terms of improving the hook joining operation. In this technique, while placing each cushion at an appropriate position of the seat frame, the hooks provided to each cushion are joined to the corresponding hooks on the shell side.

SUMMARY

In the meantime, in this kind of field, there is a demand that a shell of a seat frame corresponding to a vehicle interior member of the disclosure and a cushion corresponding to an exterior member of the disclosure be fixed to each other more firmly. In view of this, it may be considered that fasteners such as bolts are used instead of hooks to fasten and fix the cushion to the shell relatively firmly. However, in a general fastening structure, unless it is guaranteed that no load in a shear direction is applied to the fasteners, the strength should be designed based on the load in the shear direction. Therefore, when a plurality of fasteners are disposed on the same plane of the shell, the number of fastening points between the shell and the cushion should be set extremely large, taking into account that the shear force is applied to the fasteners, serving as the fastening points, in the same direction. Alternatively, it may also be considered that the strength is ensured by disposing the fasteners so as to be largely spaced apart from each other. However, in this case, there is a possibility that portions where the fasteners are disposed may be increased in size to adversely affect the external appearance of a vehicle seat. The disclosure provides a vehicle structure body in which a vehicle interior member and an exterior member can be fastened and fixed to each other more firmly without excessively increasing the number of fastening points or excessively spacing the fastening points from each other.

A vehicle structure body according to an aspect of the disclosure includes: a vehicle interior member; an exterior member that is disposed on an outer surface side of the vehicle interior member; and a fastening portion in which a first fastening seat of the vehicle interior member and a second fastening seat of the exterior member are fastened and fixed to each other in a state of being disposed to face each other. A first fastening part to which a first fastener is attached with a shaft portion of the first fastener being inserted through the first fastening part, and a second fastening part to which a second fastener is attached with a shaft portion of the second fastener being inserted through the second fastening part are provided adjacent to each other in the fastening portion. An input direction of a shear load that is applied to the shaft portion of the first fastener in an orthogonal direction and an input direction of a shear load that is applied to the shaft portion of the second fastener in an orthogonal direction differ from each other. In the above-described aspect, the vehicle interior member and the exterior member are fastened and fixed to each other by the plurality of fasteners. In this type of configuration, it is desirable that the vehicle interior member and the exterior member can be fastened and fixed to each other more firmly without excessively increasing the number of the fastening points or excessively spacing the fastening points from each other. In the above-described aspect, by causing the input directions of the shear loads to the shaft portions of the fasteners to differ from each other, the vehicle interior member and the exterior member can be fastened and fixed to each other more firmly without excessively increasing the number of the fastening points or excessively spacing the fastening points from each other.

In the above-described aspect, the second fastening part may be inclined to the first fastening part. According to this configuration, by adjusting the angle of the second fastening part with respect to the first fastening part, the input directions of the shear loads to the shaft portions of the fasteners can be made to differ from each other more reliably.

In the above-described aspect, the first fastening part and the second fastening part may be continuous with each other. According to this configuration, since the first and second fastening parts are formed continuous with each other, one of the fastening parts functions as a reinforcing rib for the other fastening part, so that the strength of the fastening portion can be further improved.

In the above-described aspect, at least one of the first fastening seat and the second fastening seat may be provided in a state of rising from a skeleton portion of the vehicle structure body. According to this configuration, the strength of the skeleton portion can be further improved by the one of the fastening seats which is provided in the rising manner.

In the above-described configuration, one of the first fastening seat and the second fastening seat may be disposed on a side to be inserted with the first fastener and the second fastener, and a surface, to be inserted with the first fastener and the second fastener, of the one of the first fastening seat and the second fastening seat may rise at an obtuse angle with respect to the skeleton portion. According to this configuration, since the surface, to be inserted with the fasteners, of the one of the fastening seats rises at the obtuse angle from the skeleton portion, the strength of the corresponding skeleton portion can be further improved while suitably ensuring a workspace for the insertion operation of the fasteners.

In the above-described configuration, one of the first fastening seat and the second fastening seat may be disposed on a side to be inserted with the first fastener and the second fastener, and at a surface, to be inserted with the first fastener and the second fastener, of the one of the first fastening seat and the second fastening seat, the shortest distance from an axis of the first fastener to the skeleton portion and the shortest distance from an axis of the second fastener to the skeleton portion may be substantially equal to each other. According to this configuration, by matching the positional relationships of the fasteners with respect to the skeleton portion, the fastening force in the first fastening part and the fastening force in the second fastening part can be balanced with each other.

According to the above-described aspect, the vehicle interior member and the exterior member can be fastened and fixed to each other more firmly without excessively increasing the number of the fastening points or excessively spacing the fastening points from each other. According to the second configuration, the vehicle interior member and the exterior member can be fastened and fixed to each other more reliably and firmly. According to the third configuration, the vehicle interior member and the exterior member can be fastened and fixed to each other still more firmly. According to the fourth configuration, the vehicle interior member and the exterior member can be fastened and fixed to each other more firmly with better performance. According to the fifth configuration, the vehicle interior member and the exterior member can be fastened and fixed to each other more firmly with even better performance. According to the sixth configuration, the vehicle interior member and the exterior member can be fastened and fixed to each other still more firmly with even better performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
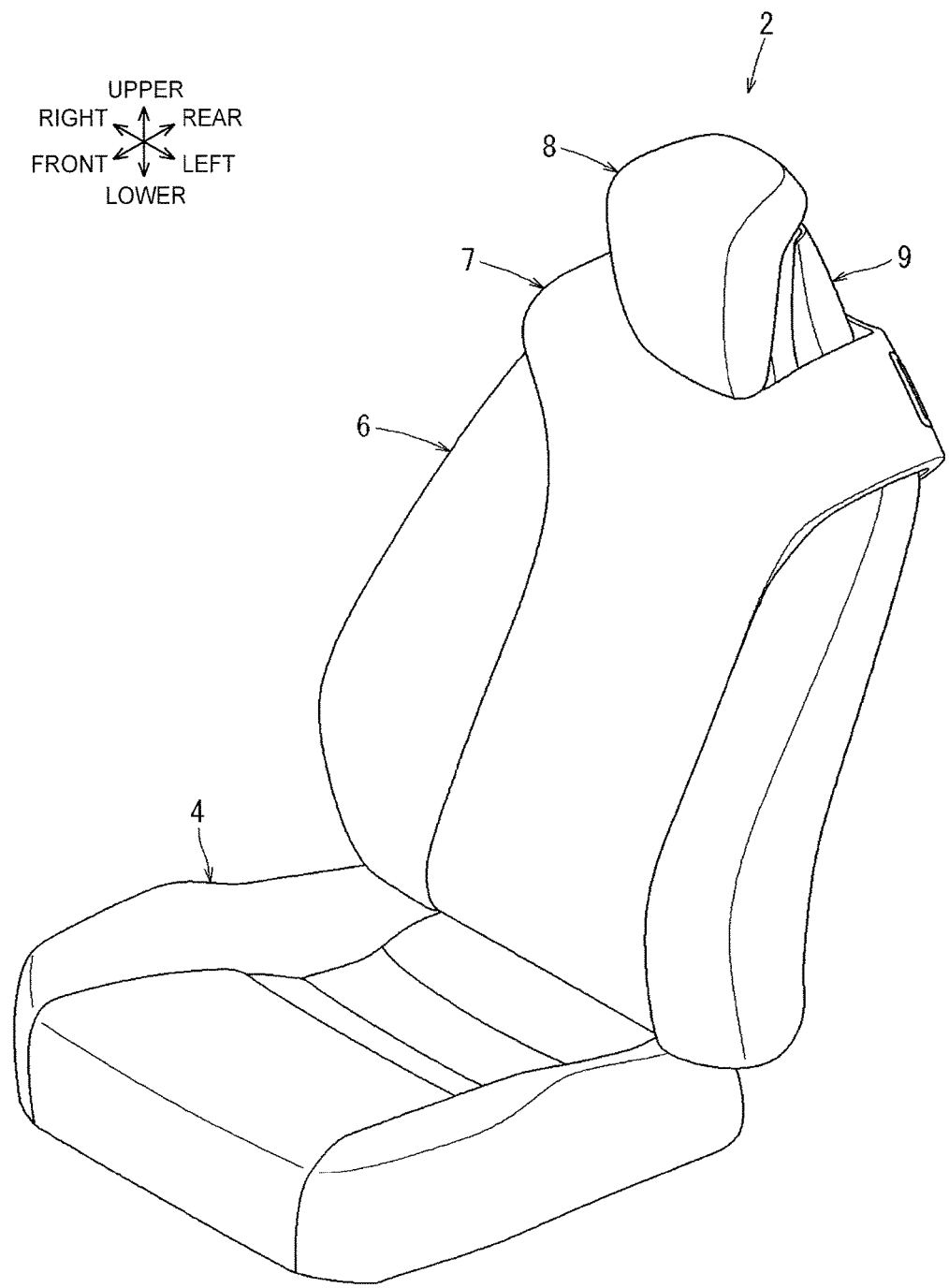
FIG. 1 is a perspective view of a vehicle seat.

Hereinbelow, a mode for carrying out the disclosure will be described with reference to FIGS. 1 to 14. In the figures, arrows indicating front and rear directions, right and left directions, and upper and lower directions of a vehicle seat are shown as appropriate. A vehicle seat 2 of FIG. 1 exemplifies a vehicle structure body of the disclosure and includes a seat cushion 4, a seat back 6 exemplifying a vehicle interior member of the disclosure, a bracket member 7 exemplifying an exterior member of the disclosure, a headrest 8, and a cover member 9. A lower portion of the seat back 6 is tiltably coupled to a rear portion of the seat cushion 4, and the headrest 8 is disposed at an upper portion of the seat back 6 in a standing state. Bar-shaped headrest stays (not shown) protrude on the lower right and left sides of the headrest 8, and these right and left headrest stays are inserted into the seat back 6. The cover member 9 is disposed in a gap between the seat back 6 and the headrest 8. The cover member 9 is disposed so as to cover the right and left headrest stays in the rear of the headrest 8.

Figure 2:
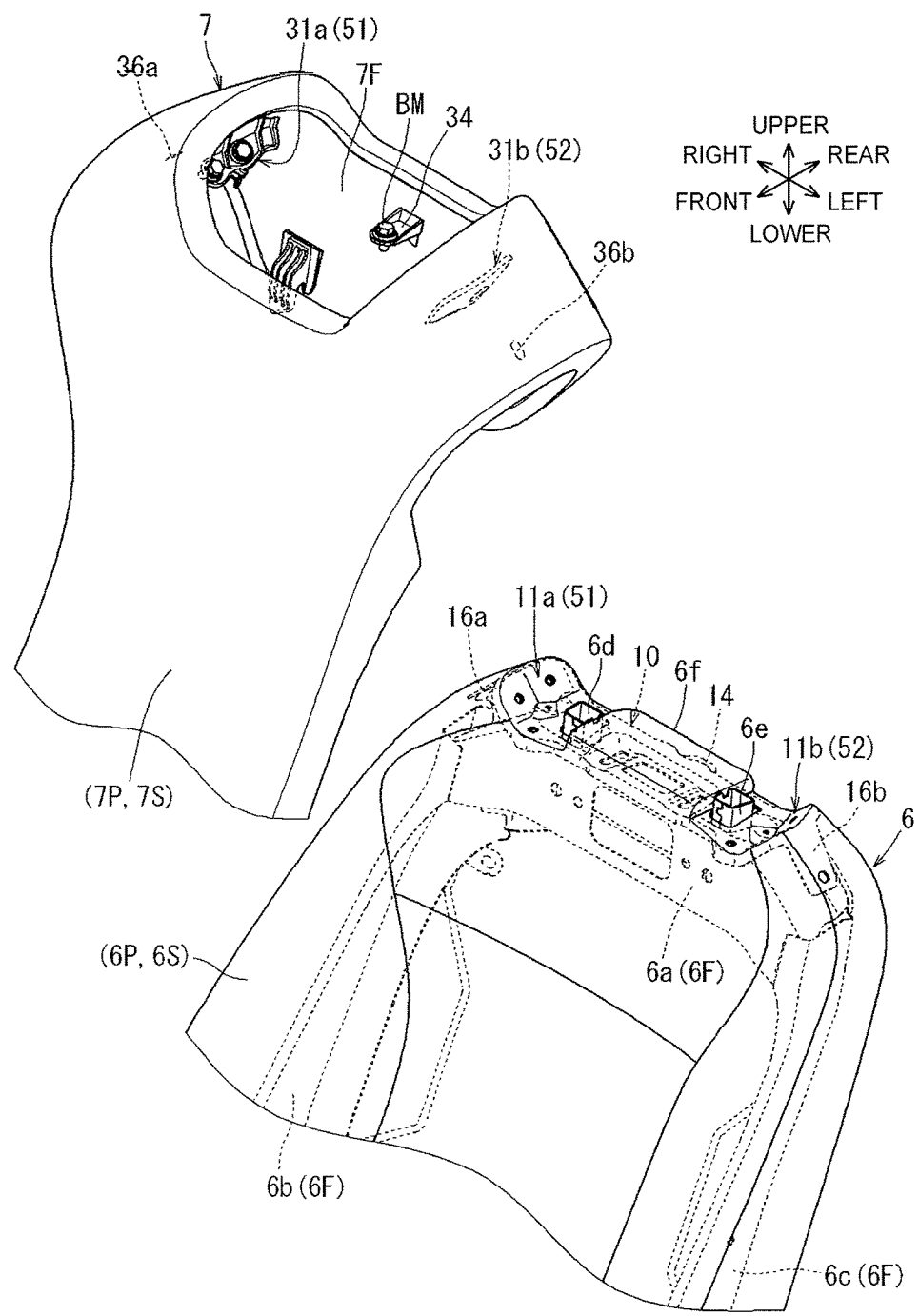
FIG. 2 is a perspective view of a portion of a seat back and a bracket member.
Figure 11:
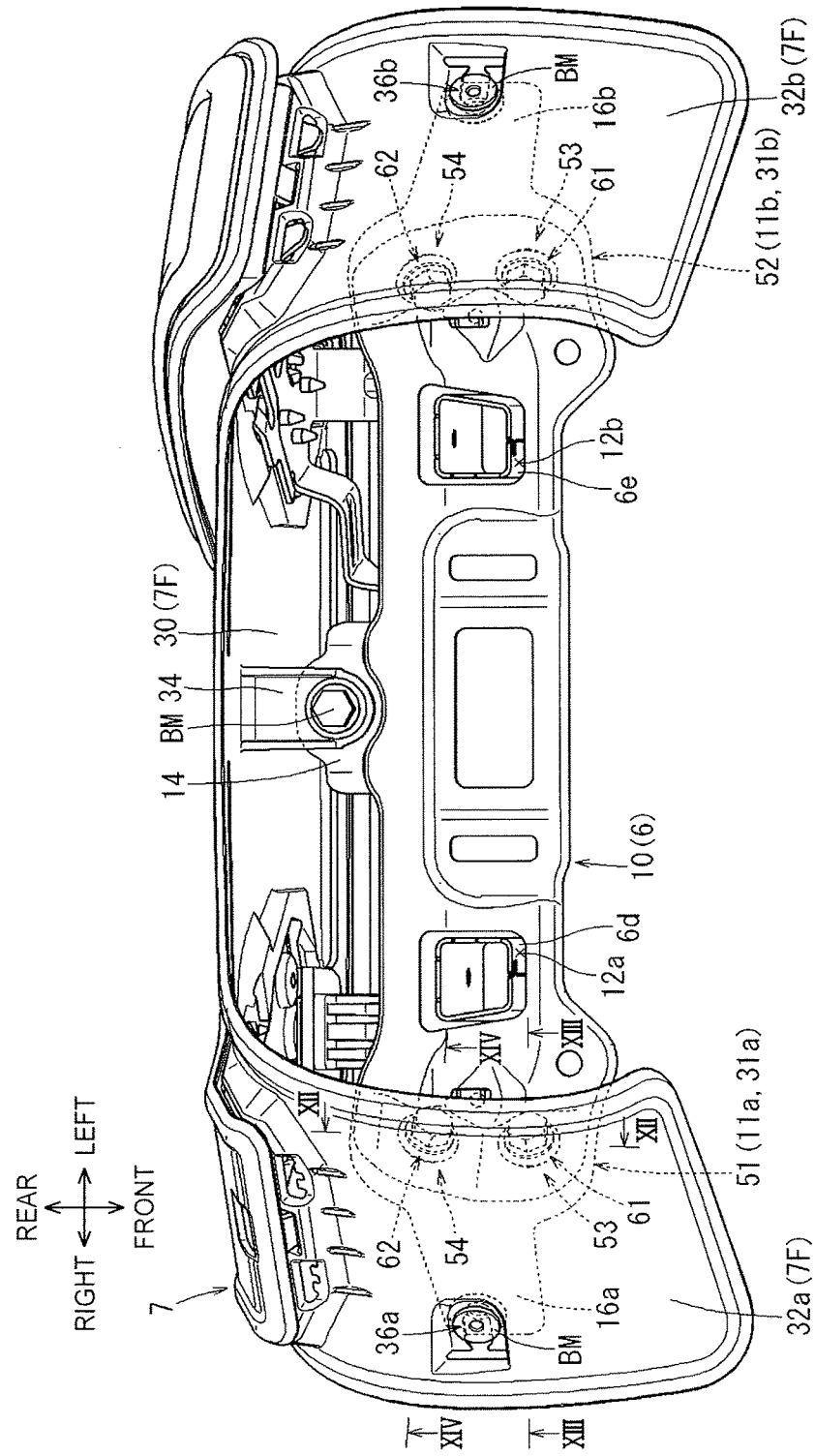
FIG. 11 is a top view of a skeleton portion of the bracket member and the fastening member.

Referring to FIG. 1, the bracket member 7 having a generally Y-shape in front view is disposed on the outer surface side of the seat back 6, and a portion of the seat back 6 from its right and left shoulders to its front surface is covered by the bracket member 7 (details of the respective members will be described later as appropriate). Referring to FIGS. 2 and 11, the seat back 6 and the bracket member 7 are fastened and fixed to each other by later-described right and left fastening portions 51 and 52, and a plurality of later-described fasteners 61 and 62 are inserted through and attached to each of the fastening portions 51 and 52. In this type of configuration, it is desirable that the seat back 6 and the bracket member 7 can be fastened and fixed to each other more firmly without excessively increasing the number of the fastening points or excessively spacing the fastening points from each other. Therefore, in this embodiment, by later-described configurations, the seat back 6 and the bracket member 7 are fastened and fixed to each other more firmly without excessively increasing the number of the fastening points or excessively spacing the fastening points from each other. Hereinbelow, the respective configurations will be described in detail.

Seat Back (Vehicle Interior Member)

Figure 3:
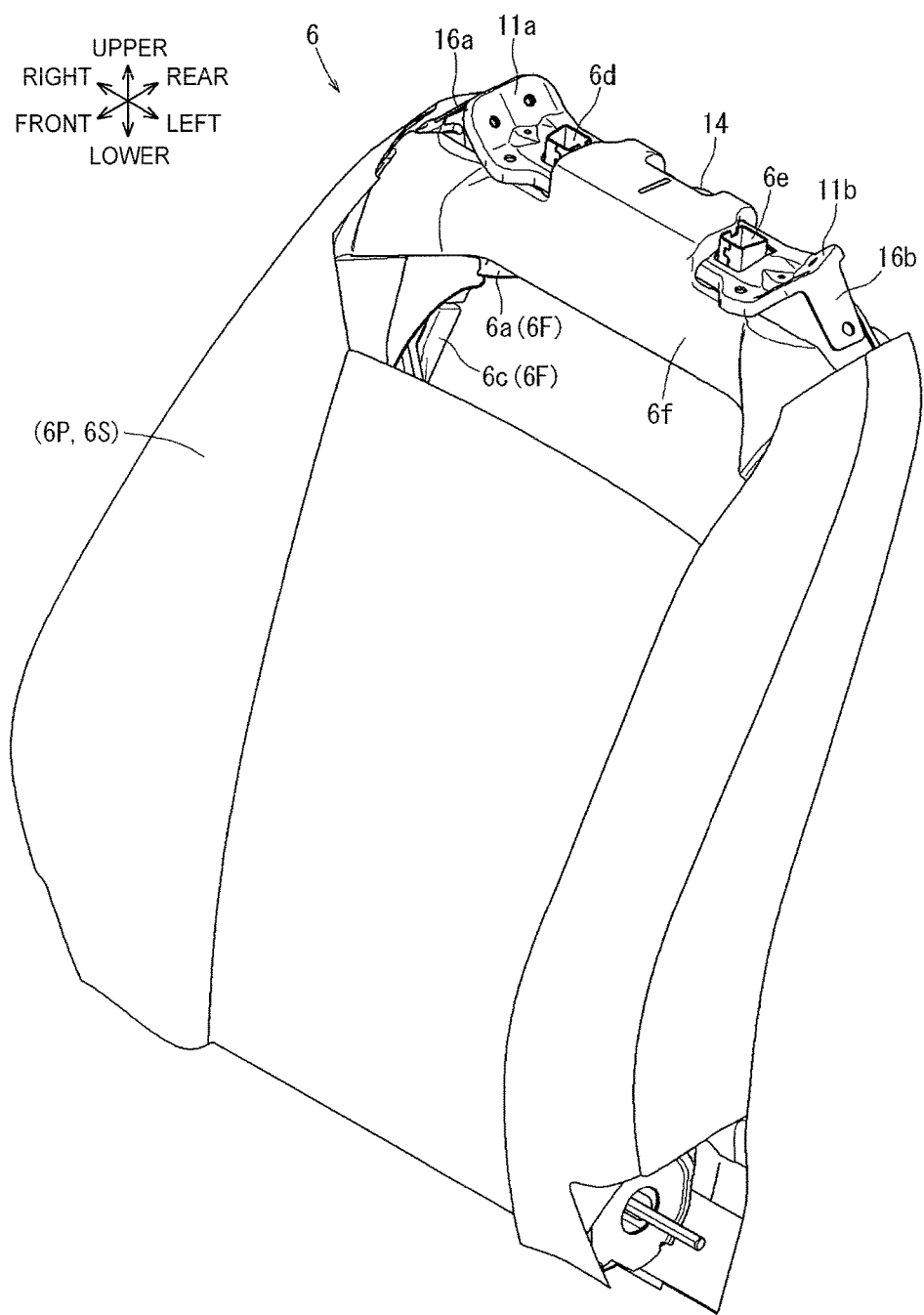
FIG. 3 is a perspective view of the seat back with a seat frame partially exposed.

Referring to FIGS. 2 and 3, the seat back 6 is a member having a generally rectangular shape in front view and serving as a backrest for a seated occupant and includes a seat pad 6P, a seat cover 6S, a seat frame 6F, and a fastening member 10. Herein, the seat pad 6P is a member forming the external shape of the seat and capable of elastically supporting the occupant and is disposed on the front surface side of the seat frame 6F. While the material of the seat pad 6P is not particularly limited, the cent pad 6P may be made of, for example, a resin foam such as a polyurethane foam (density: 10 kg/m$^3$ to 60 kg/m$^3$). The seat cover 6S is a surface member covering the seat pad 6P and the seat frame 6F and may be made of, for example, a fabric (woven fabric, knitted fabric, nonwoven fabric) or a leather (natural leather, synthetic leather).

Seat Frame (Skeleton Portion of Seat Back)

Figure 4:
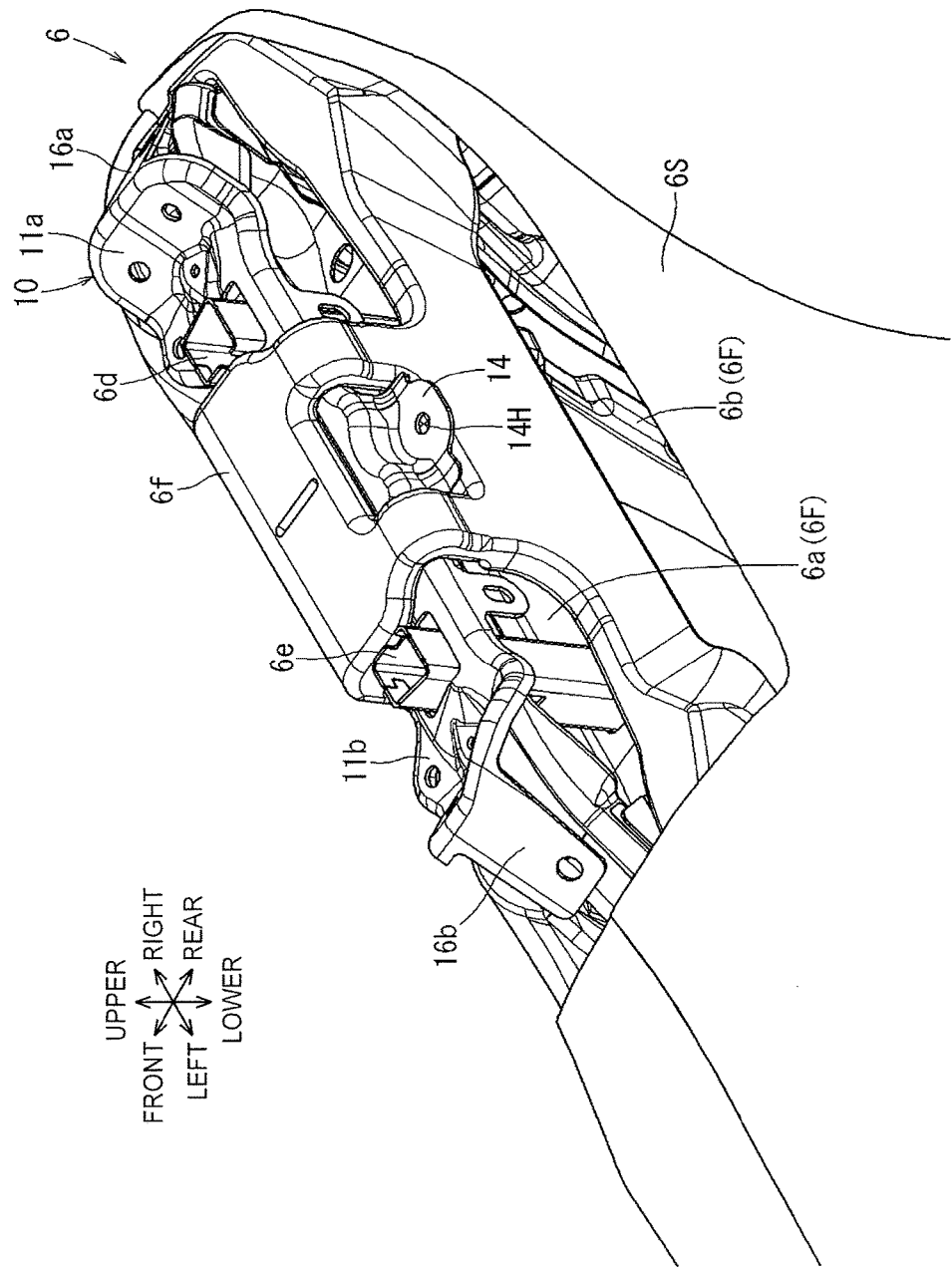
FIG. 4 is a rear perspective view of the seat back with the seat frame partially exposed.

The seat frame 6F is a generally arch-shaped frame member made of a metal and forming a skeleton portion of the seat back 6 and, referring to FIG. 2, includes an upper frame 6a and a pair of right and left side frames 6b and 6c. The right and left side frames 6b and 6c are respectively plate-like parts forming the side skeletons and are disposed at an appropriate interval therebetween in the right-left direction. The upper frame 6a is a generally prism-shaped part forming the upper skeleton and is bridged between upper portions of the right and left side frames 6b and 6c. Headrest supports 6d and 6e protrude on the upper right and left sides of the upper frame 6a. The right and left headrest supports 6d and 6e are tubular members into which the corresponding headrest stays (not shown) can be respectively inserted, and are fixed to the upper frame 6a while vertically passing through the upper frame 6a. Referring to FIGS. 3 and 4, a protective member 6f is disposed at an upper portion of the seat frame 6F and covers, from above, a front surface, an upper surface, and a rear surface of the upper frame 6a. The protective member 6f is cut out into appropriate shapes at its right and left shoulders and at its rear center, and portions (fastening seats 11a, 11b, 14, 16a, 16b, etc.) of the later-described fastening member 10 are exposed to the outside from these cut-out portions.

Figure 5:
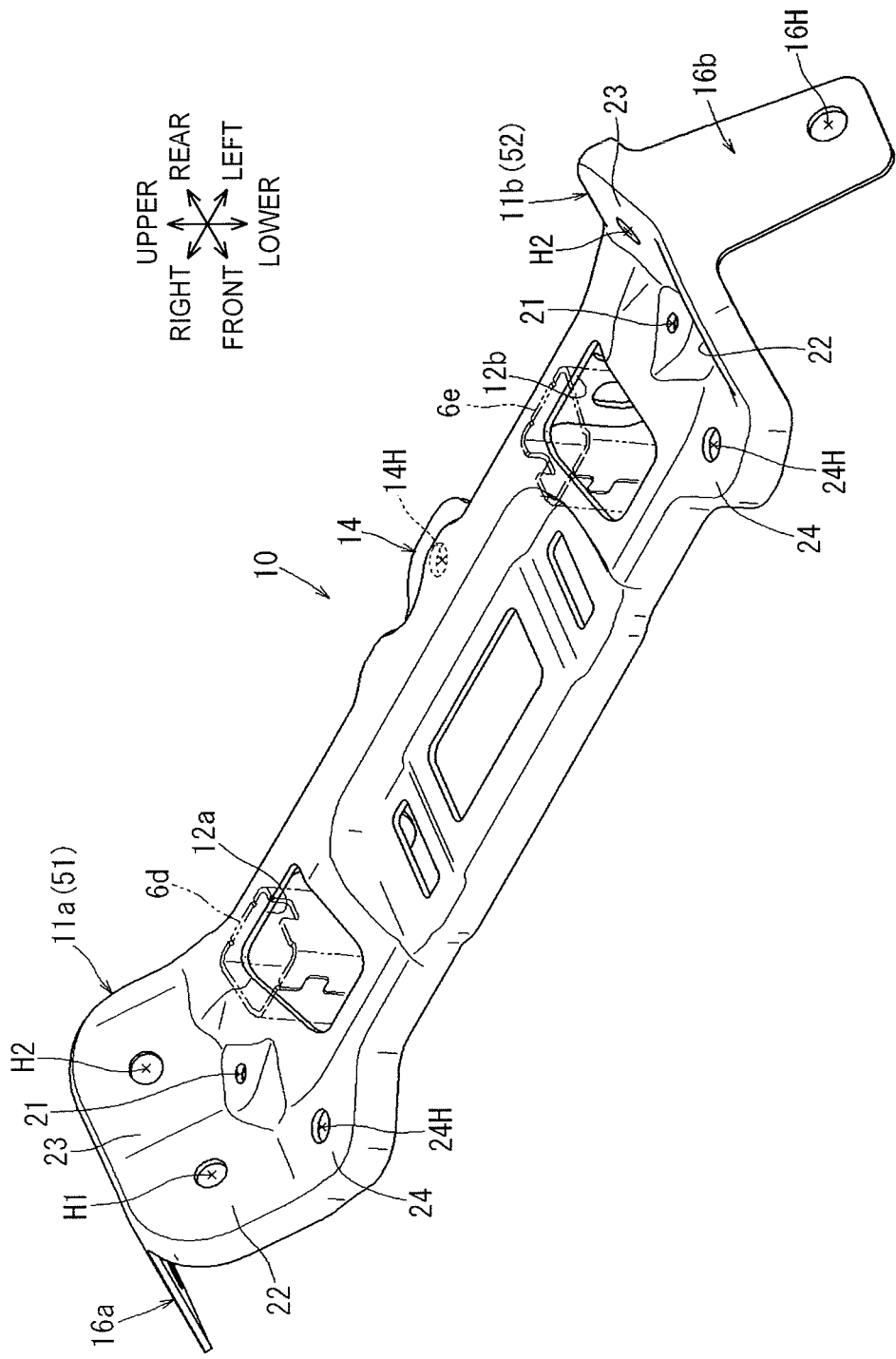
FIG. 5 is a perspective view of a fastening member.

Referring to FIG. 5, the fastening member 10 is a metal plate member elongated in the seat width direction and having a generally rectangular shape in top view and, as shown in FIGS. 3 and 4, is disposed on the upper surface of the upper frame 6a. Referring to FIGS. 3 to 5, the fastening member 10 includes a pair of later-described right and left first fastening seats 11a and 11b, a pair of right and left fitting portions 12a and 12b, a rear fastening seat 14, and a pair of right and left protruding fastening seats 16a and 16b. The peripheral edge of the fastening member 10 is bent downward in terms of ensuring the strength. The fitting portions 12a and 12b are generally rectangular through-holes provided on the right and left sides of the fastening member 10, and the corresponding headrest supports 6d and 6e can be respectively inserted through the fitting portions 12a and 12b. Referring to FIG. 4, the rear fastening seat 14 is a flat plate part extending rearward from a rear surface of the fastening member 10 and is disposed in the middle of the fastening member 10 in its longitudinal direction. A middle fastening seat 34 of the later-described bracket member 7 shown in FIG. 2 is fastened and fixed to an insertion hole 14H of the rear fastening seat 14.

The protruding fastening seats 16a and 16b are flat plate parts respectively protruding from the right and left edges of the fastening member 10 while being curved downward. Corresponding side fastening seats 36a and 36b of the later-described bracket member 7 shown in FIG. 2 are respectively fastened and fixed to through-holes 16H on the leading end sides of the protruding fastening seats 16a and 16b. Referring to FIGS. 3 and 4, the fastening member 10 is disposed on the upper surface of the upper frame 6a in a state where the corresponding headrest supports 6d and 6e are respectively inserted through the fitting portions 12a and 12b. A portion, sandwiched between the right and left headrest supports 6d and 6e, of the fastening member 10 is covered by the protective member 6f along with the upper surface of the upper frame 6a.

First Fastening Seats

Referring to FIG. 5, the first fastening seats 11a and 11b are parts respectively provided at right and left ends of the fastening member 10 and partially forming the right and left fastening portions 51 and 52 as shown in FIG. 11. The right first fastening seat 11a is the part having a generally rectangular shape in top view and forming the right end of the fastening member 10 and, as shown in FIGS. 3 and 4, is disposed near the right shoulder of the upper frame 6a. The left first fastening seat 11b is the part having a generally rectangular shape in top view and forming the left end of the fastening member 10 and is disposed near the left shoulder of the upper frame 6a. Since the first fastening seats 11a and 11b have symmetrical shapes and have substantially the same basic configuration, the right first fastening seat 11a will be described in detail hereinbelow by way of example.

Figure 6:
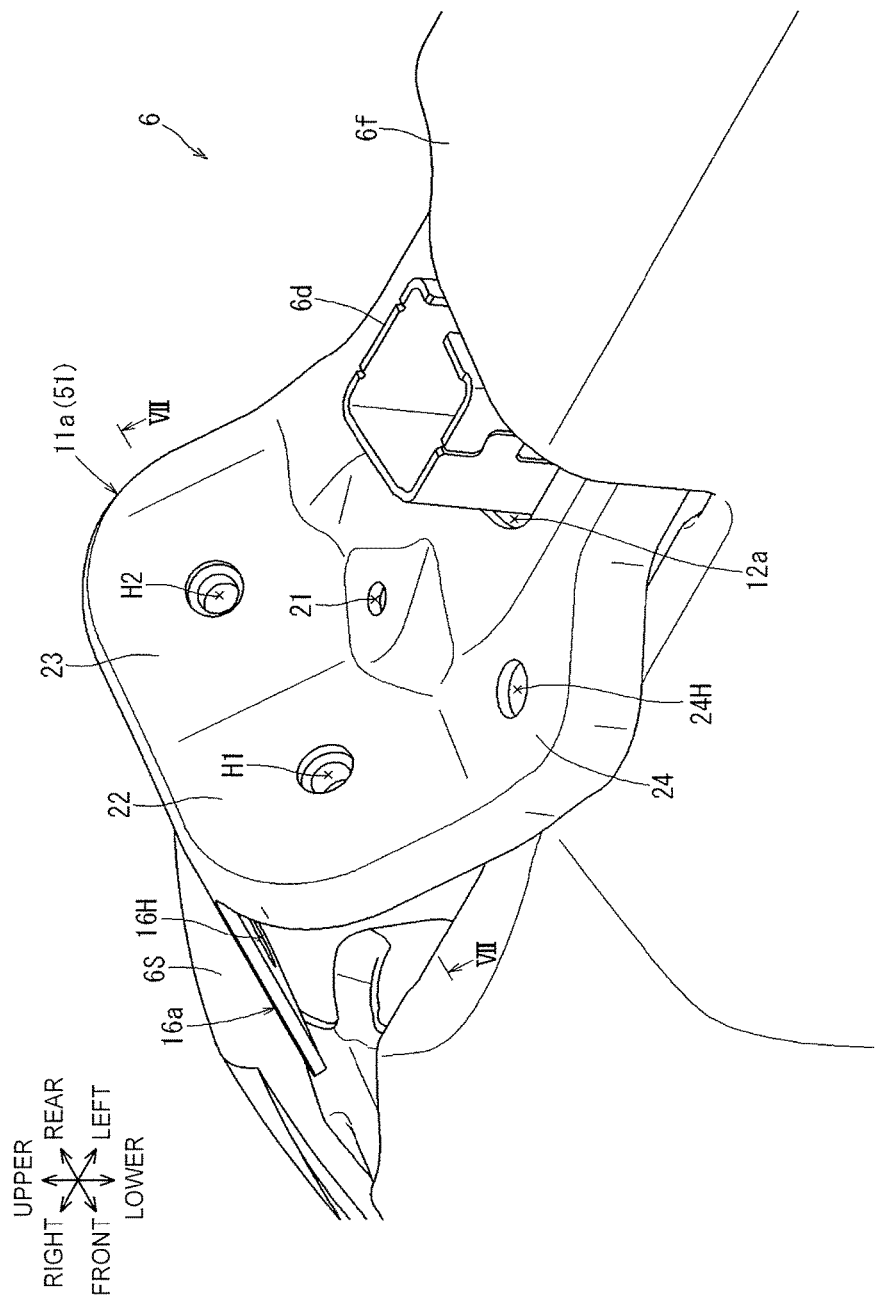
FIG. 6 is an enlarged perspective view of a portion of the seat back, wherein a first fastening seat is shown.

Referring to FIG. 6, the right first fastening seat 11a includes a positioning hole portion 21, a front-lower fastening seat 22, a rear-lower fastening seat 23, and an auxiliary fastening seat 24 that are integrally formed. Herein, the positioning hole portion 21 is a through-hole provided on the right side of the right fitting portion 12a, and a positioning projecting portion 41 of a later-described second fastening seat 31a shown in FIG. 8 can be inserted into the positioning hole portion 21. The auxiliary fastening seat 24 is a flat plate part disposed around the positioning hole portion 21 and is provided at its front portion with a through-hole 24H. Referring to FIG. 2, an upper surface of the auxiliary fastening seat 24 is disposed substantially horizontal in a state where the fastening member 10 is disposed on the upper frame 6a, and forms the main surface of the first fastening seat 11a. For example, a locking member (not shown) fixed to an end portion of the seat cover 6S can be inserted through and fixed to the through-hole 24H of the auxiliary fastening seat 24.

Figure 7:
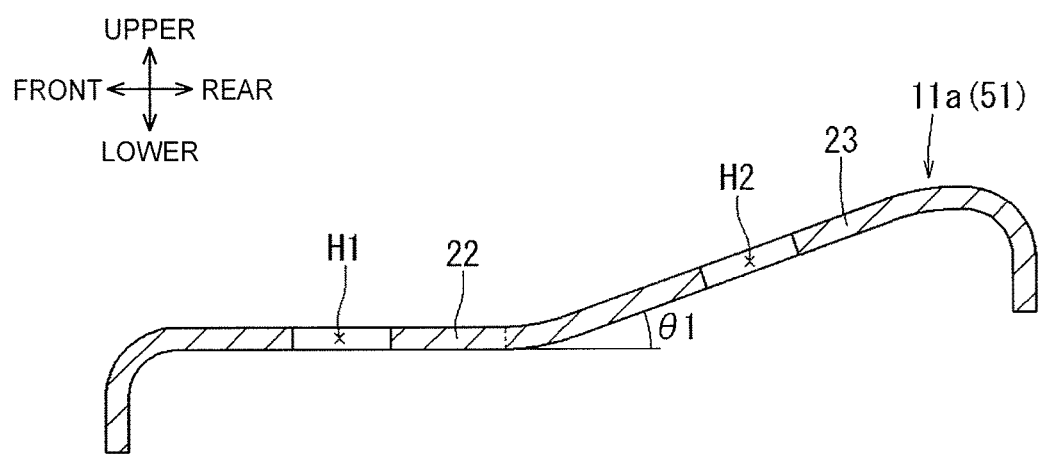
FIG. 7 is a sectional view of the first fastening seat taken along line VII-VII of FIG. 6.

Referring to FIG. 6, the front-lower fastening seat 22 is a flat plate part formed of an upper-surface front portion at a right end of the first fastening seat 11a. A generally circular insertion hole H1 being a through-hole is provided at the center of the front-lower fastening seat 22, and a shaft portion 61b of the later-described first fastener 61 shown in FIG. 12 can be inserted through the insertion hole H1. The rear-lower fastening seat 23 is a flat plate part formed of an upper-surface rear portion at the right end of the first fastening seat 11a and is continuous with a rear end of the front-lower fastening seat 22. A generally circular insertion hole H2 being a through-hole is provided also at the center of the rear-lower fastening seat 23, and a shaft portion 62b of the later-described second fastener 62 shown in FIG. 12 can be inserted through the insertion hole H2. Referring to FIG. 6, the front-lower fastening seat 22 and the rear-lower fastening seat 23 are disposed in a state of being inclined upward with respect to the auxiliary fastening seat 24 serving as the main surface, and gradually rise upward as going rightward. Referring further to FIG. 7, the rear-lower fastening seat 23 is disposed in an inclined state in which the rear-lower fastening seat 23 gradually rises upward at an angle θ1 with respect to the front-lower fastening seat 22 as going rearward. Herein, referring to FIG. 12, the range of the angle θ1 is not particularly limited as long as the later-described fasteners 61 and 62 can be inserted through corresponding fastening parts 53 and 54, but can typically be set to 0°<θ1<90°.

Bracket Member (Exterior Member)

Referring to FIGS. 1 and 2, the bracket member 7 is a member disposed on the outer surface side of the seat back 6 and includes a pad portion 7P, a skin portion 7S, and a frame portion 7F. The pad portion 7P is a member covering the front surface of the seat back 6 and having a generally Y-shape in front view and may be made of the exemplified material of the seat pad 6P. The upper side of the pad portion 7P is disposed so as to cover an outer surface of the later-described frame portion 7F. The skin portion 7S is a surface member covering a surface of the pad portion 7P and may be made of the exemplified material of the seat cover 6S.

Frame Portion (Skeleton Portion of Bracket Member)

Figure 8:
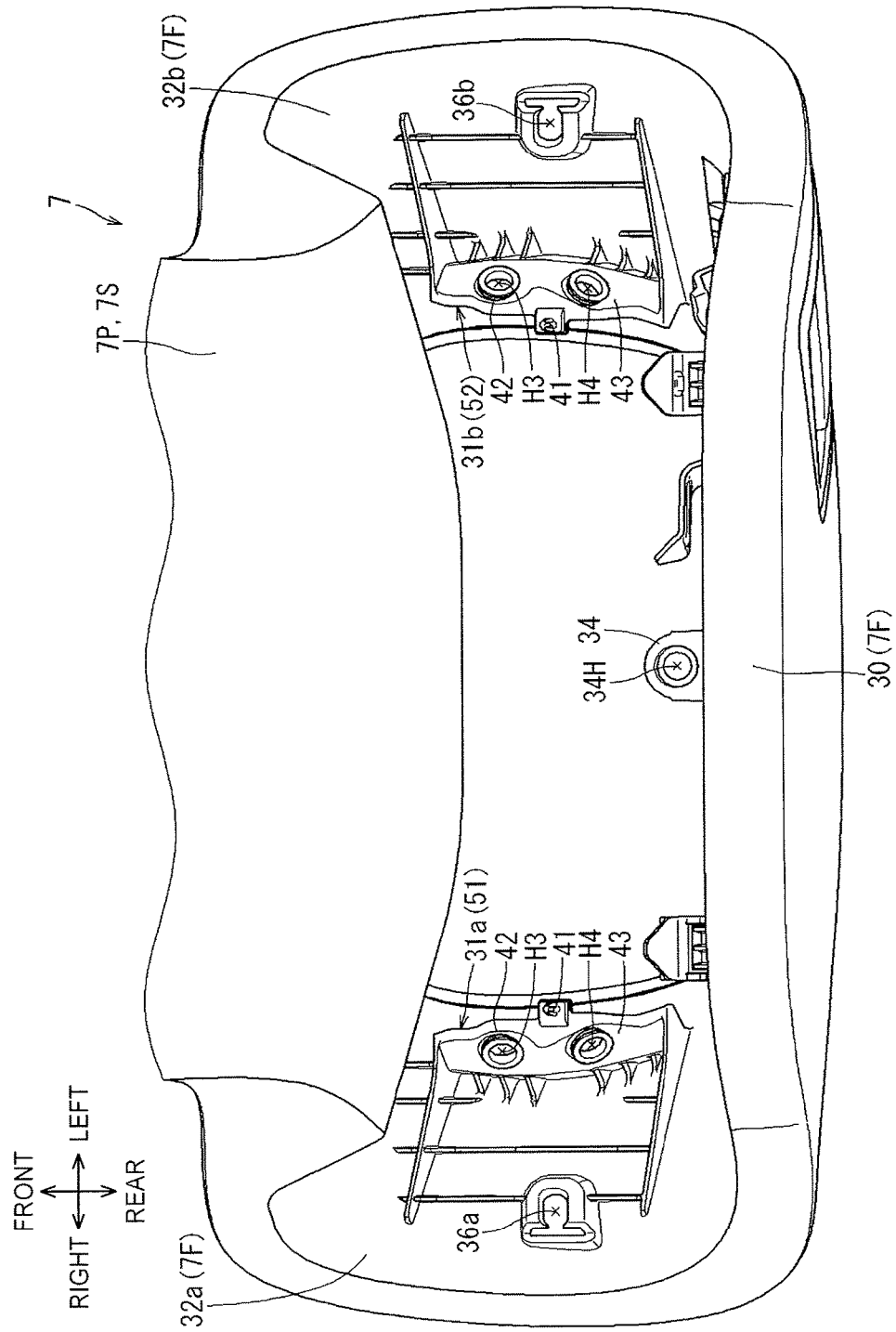
FIG. 8 is a bottom view of the bracket member.
Figure 10:
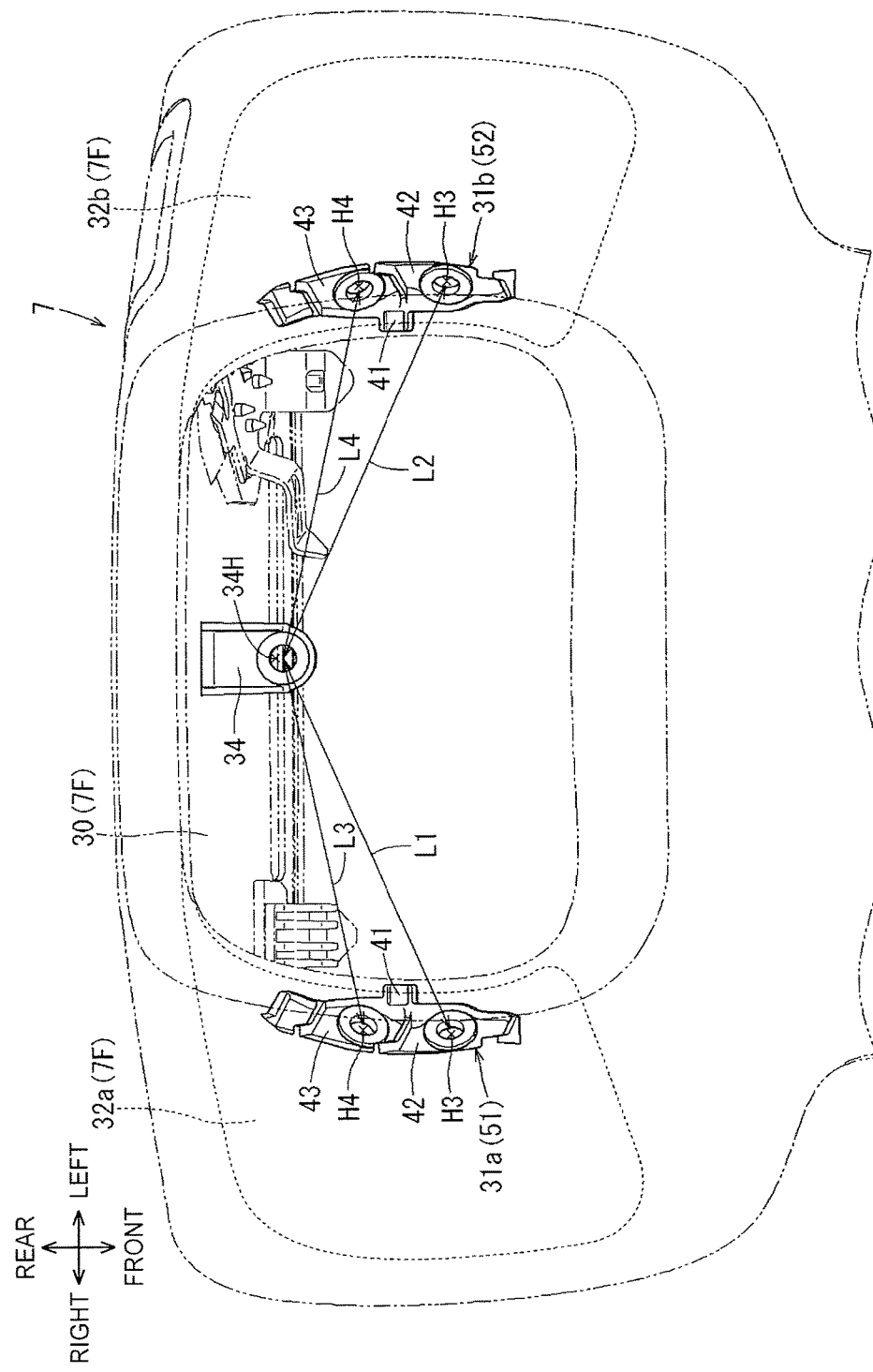
FIG. 10 is a see-through top view of the bracket member.

Referring to FIGS. 10 and 11, the frame portion 7F is a plate-like member forming a skeleton portion of the bracket member 7 and may typically be made of a hard resin or a metal. The frame portion 7F includes a body portion 30, a pair of later-described right and left second fastening seats 31a and 31b, a pair of right and left shoulder hanging portions 32a and 32b, a middle fastening seat 34, and a pair of right and left side fastening seats 36a and 36b. The body portion 30 is a generally rectangular part disposed in the rear of the upper frame 6a shown in FIG. 2. The right shoulder hanging portion 32a is a part protruding forward and upward from a right end of the body portion 30 and is disposed so as to cover the right shoulder of the upper frame 6a. The left shoulder hanging portion 32b is a part protruding forward and upward from a left end of the body portion 30 and is disposed so as to cover the left shoulder of the upper frame 6a. Referring to FIGS. 8 and 11, the middle fastening seat 34 is a flat plate part having a generally rectangular shape in top view and protrudes forward from an inner surface of the body portion 30 in the middle in the seat width direction. The rear fastening seat 14 of the fastening member 10 shown in FIG. 2 is fastened and fixed to an insertion hole 34H provided at a front portion of the middle fastening seat 34. The right and left side fastening seats 36a and 36b are hole portions passing through the corresponding shoulder hanging portions 32a and 32b in the thickness direction. The corresponding protruding fastening seats 16a and 16b of the fastening member 10 shown in FIG. 2 are respectively fastened and fixed to the right and left side fastening seats 36a and 36b.

Second Fastening Seats

Referring to FIG. 8, the second fastening seats 31a and 31b are parts provided on right and left inner surfaces of the frame portion 7F and partially forming the later-described right and left fastening portions 51 and 52 as shown in FIG. 11. The right second fastening seat 31a is a flat plate part rising from the inner surface of the right shoulder hanging portion 32a and is disposed so as to face the right first fastening seat 11a shown in FIG. 2. The left second fastening seat 31b is a flat plate part rising from the inner surface of the left shoulder hanging portion 32b and is disposed so as to face the left first fastening seat 11b shown in FIG. 2. In this embodiment, the right and left second fastening seats 31a and 31b are provided in the rising manner and thus function as reinforcing ribs that reinforce the corresponding shoulder hanging portions 32a and 32b. Since the second fastening seats 31a and 31b have symmetrical shapes and have substantially the same basic configuration, the right second fastening seat 31a will be described in detail hereinbelow by way of example.

Figure 9:
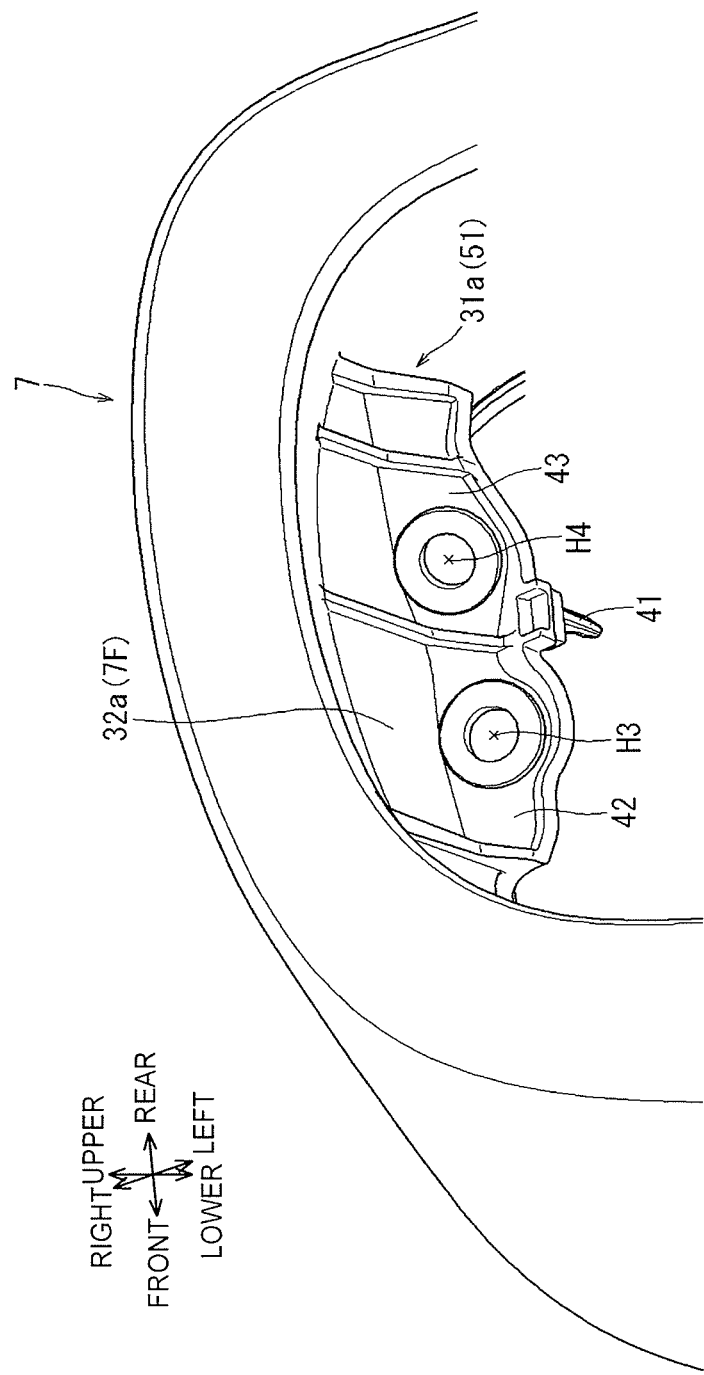
FIG. 9 is an enlarged perspective view of a portion of the bracket member, wherein a second fastening seat is shown.
Figure 12:
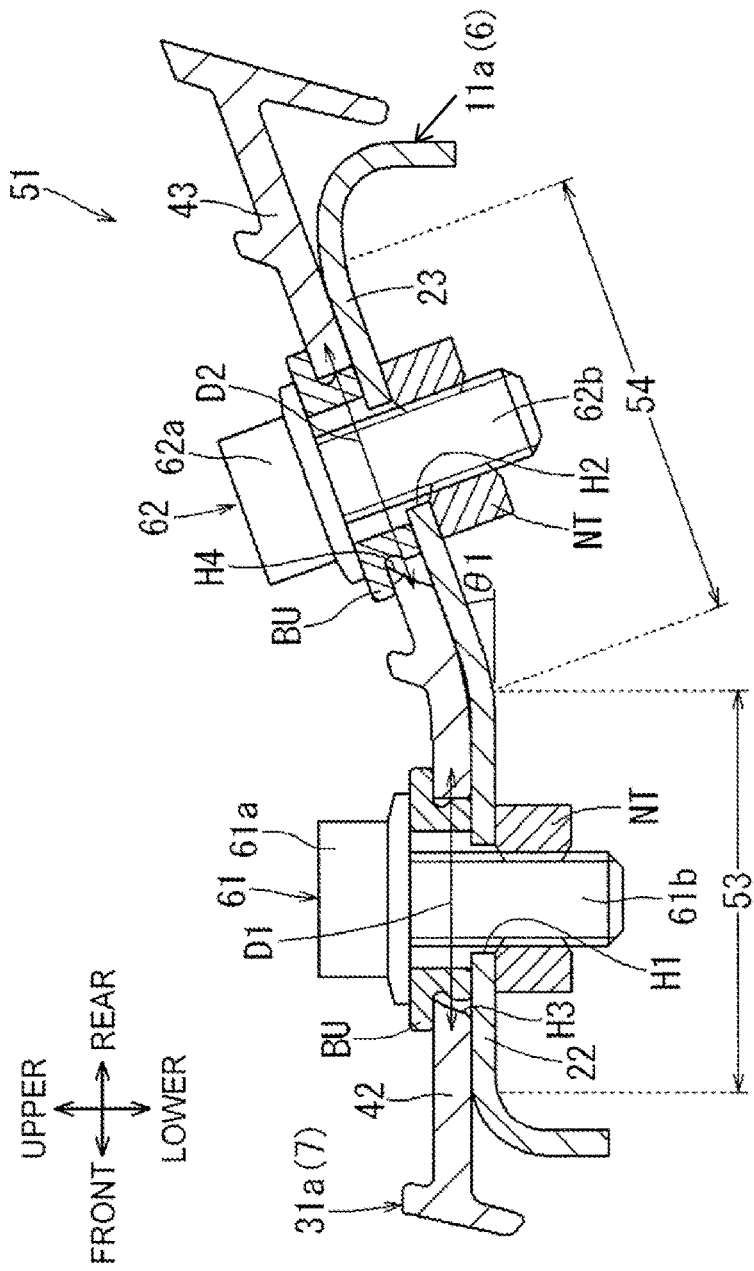
FIG. 12 is a sectional view of a fastening portion taken along line XII-XII of FIG. 11.
Figure 13:
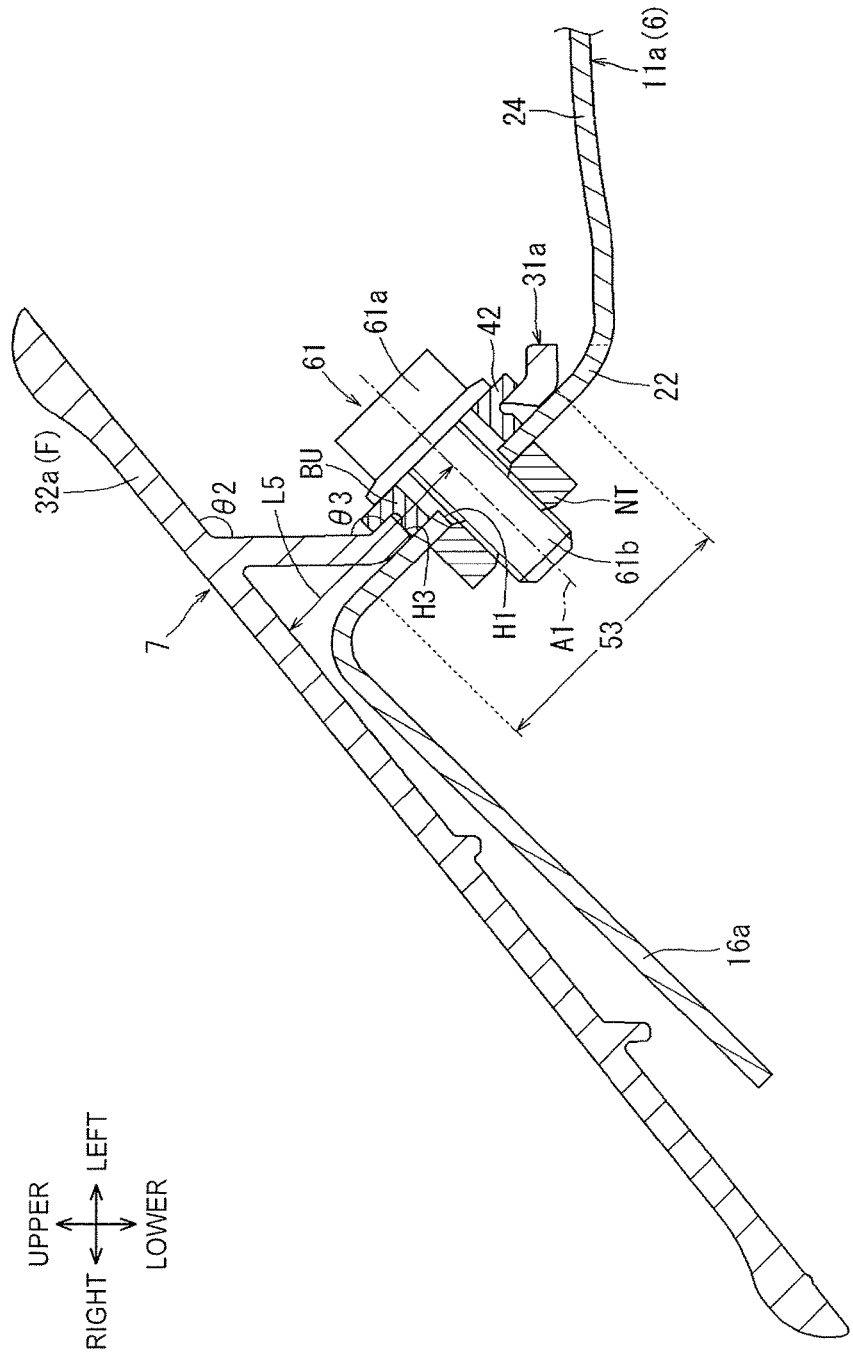
FIG. 13 is a sectional view of the fastening portion taken along line XIII-XIII of FIG. 11.
Figure 14:
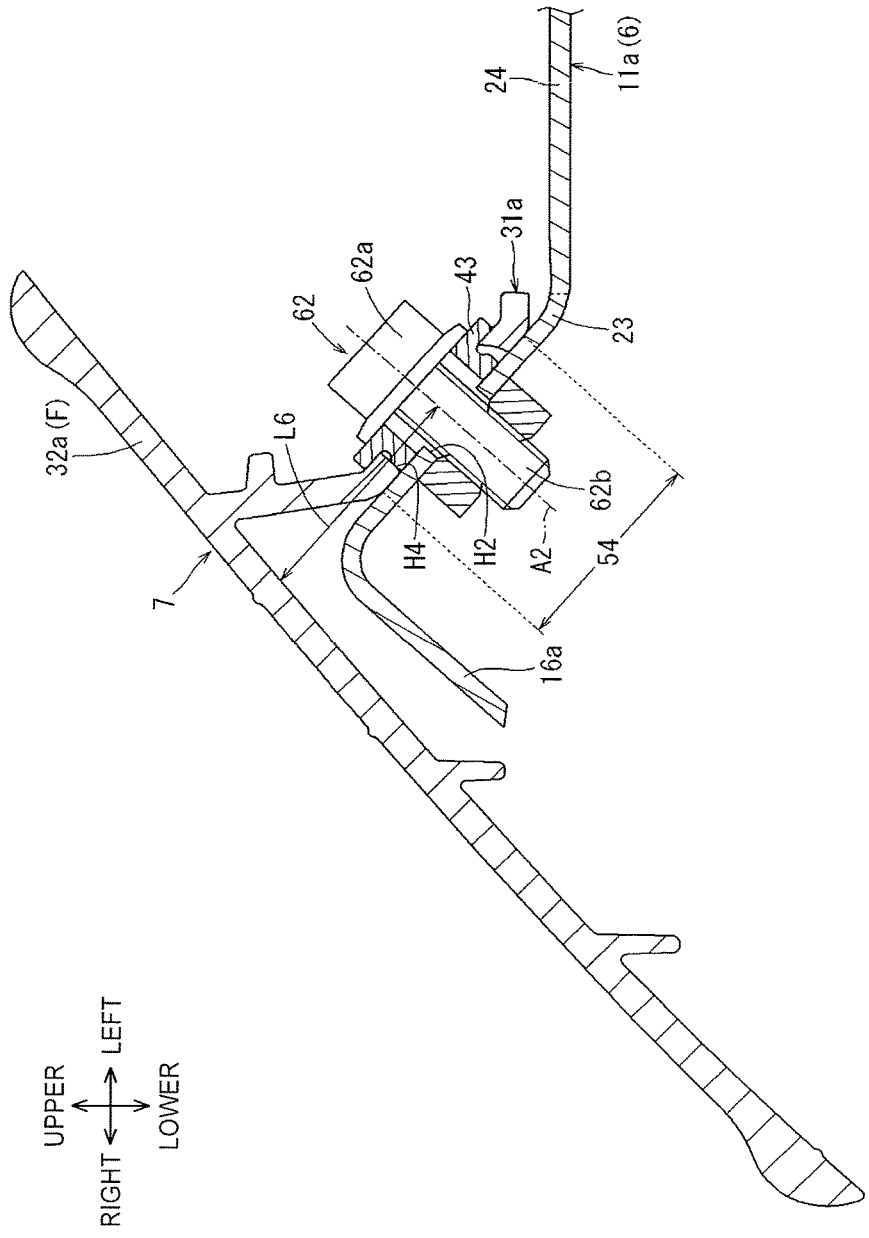
FIG. 14 is a sectional view of the fastening portion taken along line XIV-XIV of FIG.

Referring to FIG. 9, the right second fastening seat 31a is a generally rectangular flat plate part elongated in the seat front-rear direction and includes a positioning projecting portion 41, a front-upper fastening seat 42, and a rear-upper fastening seat 43 that are integrally formed. Herein, the positioning projecting portion 41 is a claw-shaped part protruding downward at a left end of the second fastening seat 31a and is disposed at a position where the positioning projecting portion 41 can be inserted into the positioning hole portion 21 of the first fastening seat 11a shown in FIG. 6. Referring to FIG. 9, the front-upper fastening seat 42 is a flat plate part formed of a front portion of the second fastening seat 31a. A generally circular insertion hole H3 being a through-hole is provided at the center of the front-upper fastening seat 42, and the shaft portion 61b of the later-described first fastener 61 shown in FIG. 12 can be inserted through the insertion hole H3. The rear-upper fastening seat 43 is a flat plate part formed of a rear portion of the second fastening seat 31a and is continuous with a rear end of the front-upper fastening seat 42. A generally circular insertion hole H4 being a through-hole is provided also at the center of the rear-upper fastening seat 43, and the shaft portion 62b of the later-described second fastener 62 shown in FIG. 12 can be inserted through the insertion hole H4. Referring to FIG. 12, in the fastening operation of the later-described fastening portion 51, the front-upper fastening seat 42 is disposed to face the front-lower fastening seat 22, and the rear-upper fastening seat 43 is disposed to face the rear-lower fastening seat 23. Therefore, following the rear-lower fastening seat 23, the rear-upper fastening seat 43 is disposed in an inclined state (angle θ1) in which the rear-upper fastening seat 43 gradually rises upward as going rearward.

Herein, referring to FIG. 10, in the bracket member 7, the right and left second fastening seats 31a and 31b are disposed at positions such that the second fastening seats 31a and 31b are symmetrical with respect to the insertion hole 34H of the middle fastening seat 34 of the body portion 30. Therefore, the shortest distance L1 from the insertion hole H3 of the right second fastening seat 31a to the central insertion hole 34H and the shortest distance L2 from the insertion hole H3 of the left second fastening seat 31b to the central insertion hole 34H are substantially equal to each other. Likewise, the shortest distance L3 from the insertion hole H4 of the right second fastening seat 31a to the central insertion hole 34H and the shortest distance L4 from the insertion hole H4 of the left second fastening seat 31b to the central insertion hole 34H are substantially equal to each other. Accordingly, by the later-described fastening operation, the later-described fasteners 61 and 62 are inserted through the corresponding right and left insertion holes H3 and H4 so as to be disposed in a well-balanced manner on the right and left sides of the bracket member 7. Therefore, the bracket member 7 is fastened and fixed to the seat back 6 so as to be balanced well to the right and left with respect to the middle fastening seat 34.

In this embodiment, the later-described fasteners 61 and 62 are inserted from above the second fastening seats 31a and 31b, and an upper surface, to be inserted with the fasteners 61 and 62, of each of the second fastening seats 31a and 31b rises from the inner surface of the corresponding shoulder hanging portion 32a, 32b at an obtuse angle. For example, referring to FIG. 13, the upper surface of the right second fastening seat 31a rises from the inner surface of the right shoulder hanging portion 32a at an obtuse angle θ2 and is further bent at an obtuse angle θ3 at a portion where the upper fastening seats 42 and 43 are formed. By providing the large angle between the upper surface of the second fastening seat 31a and the inner surface of the shoulder hanging portion 32a in this way, a workspace is suitably ensured for the insertion operation of the fasteners 61 and 62. Further, in this embodiment, referring to FIGS. 13 and 14, the shortest distance L5 from the center of the insertion hole H3 of the front-upper fastening seat 42 to the inner surface of the shoulder hanging portion 32a and the shortest distance L6 from the center of the insertion hole H4 of the rear-upper fastening seat 43 to the inner surface of the shoulder hanging portion 32a can be set substantially equal to each other. Herein, the shortest distance L5 and the shortest distance L6 being substantially equal to each other means that even if the shortest distance L5 and the shortest distance L6 slightly differ from each other, those distances can be regarded as being equal to each other if the difference is within an error that is allowed on design.

Fastening Operation of Seat Back and Bracket Member

Referring to FIG. 2, while applying the bracket member 7 to the seat back 6 from above, the fastening seats of the bracket member 7 are disposed to face the corresponding fastening seats of the seat back 6 from above. In this event, while disposing the middle fastening seat 34 of the bracket member 7 so as to face the rear fastening seat 14 of the fastening member 10 from above, a bolt member BM is inserted through the insertion holes 34H and 14H of both fastening seats, thereby fastening and fixing both fastening seats together as shown in FIG. 11. Further, while disposing the right and left side fastening seats 36a and 36b of the bracket member 7 so as to face the through-holes 16H of the corresponding protruding fastening seats 16a and 16b of the fastening member 10 from above, bolt members BM are inserted therethrough to fasten and fix them together as shown in FIG. 11.

Formation of Fastening Portions (First Fastening Parts, Second Fastening Parts)

Along with the fastening operation described above, referring to FIGS. 2 and 11, the right and left second fastening seats 31a and 31b of the bracket member 7 are disposed to face the corresponding first fastening seats 11a and 11b on the seat back 6 side from above. In this way, the right fastening portion 51 where the right first fastening seat 11a and the right second fastening seat 31a are disposed to face each other is formed, and the left fastening portion 52 where the left first fastening seat 11b and the left second fastening seat 31b are disposed to face each other is formed. Since the formation sequences and the basic configurations of the right and left fastening portions 51 and 52 are substantially the same in this embodiment, the right fastening portion 51 will be described in detail hereinbelow by way of example. When forming the right fastening portion 51, the first fastening seat 11a and the second fastening seat 31a can be disposed to face each other in an appropriate positional relationship by inserting the positioning projecting portion 41, shown in FIG. 9, of the second fastening seat 31a into the positioning hole portion 21, shown in FIG. 6, of the first fastening seat 11a. Referring to FIG. 12, in the fastening portion 51 of this state, the first fastening part 53 and the second fastening part 54 are formed adjacent to each other continuously. The first fastening part 53 is a part that is formed such that the front-upper fastening seat 42 and the front-lower fastening seat 22 are disposed to face each other and that the insertion holes H3 and H1 of both fastening seats are disposed to overlap each other. The second fastening part 54 is a part that is formed such that the rear-upper fastening seat 43 and the rear-lower fastening seat 23 are disposed to face each other and that the insertion holes H4 and H2 of both fastening seats are disposed to overlap each other.

Insertion of First Fasteners and Second Fasteners

Referring to FIG. 12, the first fastener 61 is attached by being inserted through the first fastening part 53 from above, while the second fastener 62 is attached by being inserted through the second fastening part 54 from above. The first fastener 61 is a bolt-like member and has a large-diameter head portion 61a and a small-diameter elongated shaft portion 61b. The second fastener 62 is a bolt-like member with the same shape and size as the first fastener 61 and has a head portion 62a and a shaft portion 62b. In the first fastening part 53, the shaft portion 61b of the first fastener 61 is inserted through the insertion holes H3 and H1 from the second fastening seat 31a side with a bush BU disposed in place, and further, a nut NT is screwed onto the shaft portion 61b protruding on the first fastening seat 11a side. Likewise, in the second fastening part 54, the shaft portion 62b of the second fastener 62 is inserted through the insertion holes H4 and H2 from the second fastening seat 31a side with a bush BU disposed in place, and further, a nut NT is screwed onto the shaft portion 62b protruding on the first fastening seat 11a side. In this event, referring to FIGS. 13 and 14, since the upper surface of the second fastening seat 31a rises from the shoulder hanging portion 32a at the obtuse angle θ2 so that the workspace is suitably ensured, the shaft portion 61b (62b) of each fastener can be smoothly inserted through the corresponding insertion holes H3 and H1 (H4 and H2). By attaching the fasteners 61 and 62 to the right and left fastening portions 51 and 52 in this way, the seat back 6 and the bracket member 7 are fastened and fixed to each other. In this type of configuration, it is desirable that the seat back 6 and the bracket member 7 can be fastened and fixed to each other more firmly without excessively increasing the number of the fasteners serving as the fastening points or excessively spacing the fasteners serving as the fastening points from each other.

Therefore, in this embodiment, referring to FIG. 12, the first fastening part 53 and the second fastening part 54 are provided so as to be inclined to each other such that the fastener attaching surface of the first fastening part 53 and the fastener attaching surface of the second fastening part 54 are disposed while changing the surface direction. That is, the upper surface of the rear-upper fastening seat 43 corresponding to the fastener attaching surface of the second fastening part 54 is disposed so as to be inclined approximately at the angle θ1 with respect to the upper surface of the front-upper fastening seat 42 corresponding to the fastener attaching surface of the first fastening part 53. Therefore, according to the inclination degree of the second fastening part 54, an input direction D1 of a shear load that is applied to the shaft portion 61b of the first fastener 61 in the orthogonal direction and an input direction D2 of a shear load that is applied to the shaft portion 62b of the second fastener 62 in the orthogonal direction differ from each other approximately by the angle θ1. Consequently, when a shear load is applied to the shaft portion 61b of the first fastener 61 in the input direction D1, a tensile load in the axial direction is solely applied to the shaft portion 62b of the second fastener 62. Inversely, when a shear load is applied to the shaft portion 62b of the second fastener 62 in the input direction D2, a tensile load in the axial direction is solely applied to the shaft portion 61b of the first fastener 61. In this way, since the shaft portion 61b of the first fastener 61 and the shaft portion 62b of the second fastener 62 respectively receive the loads (shear load and tensile load) in the directions that change the distance between the shaft portions 61b and 62b, the margin of strength can be ensured compared to the case where the shaft portions 61b and 62b receive shear loads in the same direction. Since the directions of bending loads that are applied to the upper surfaces serving as the fastener attaching surfaces in the second fastening seat 31a differ from each other, the first fastening seat 11a, being the component fastened to the second fastening seat 31a, can take a simple and inexpensive structure except at a portion where the stress is concentrated. In this way, in this embodiment, by causing the input directions of shear loads to the shaft portions 61b and 62b of the fasteners 61 and 62 to differ from each other, the seat back 6 and the bracket member 7 can be fastened and fixed to each other more firmly without excessively increasing the number of the fasteners serving as the fastening points or excessively spacing the fasteners serving as the fastening points from each other.

In this embodiment, the first fastening part 53 and the second fastening part 54 are provided continuously without being divided. Therefore, one of the fastening parts 53 and 54 can function as a reinforcing rib for the other of the fastening parts 53 and 54, so that the strength of the right and left fastening portions 51 and 52 can be enhanced. In this embodiment, referring to FIGS. 13 and 14, the distances from the insertion holes H3 and H4 in the second fastening seat 31a to the shoulder hanging portion 32a can be set substantially constant. Accordingly, at the upper surface of the second fastening seat 31a, the shortest distance L5 from an axis A1 of the first fastener 61 shown in FIG. 13 to the shoulder hanging portion 32a and the shortest distance L6 from an axis A2 of the second fastener 62 shown in FIG. 14 to the shoulder hanging portion 32a can be set substantially equal to each other. By matching the positional relationships of the fasteners 61 and 62 with respect to the shoulder hanging portion 32a in this way, the fastening force in the first fastening part 53 and the fastening force in the second fastening part 54 can be balanced with each other.

As described above, in this embodiment, by causing the input directions of shear loads to the shaft portions 61b and 62b of the fasteners 61 and 62 to differ from each other, the seat back 6 and the bracket member 7 can be fastened and fixed to each other more firmly without excessively increasing the number of the fastening points or excessively spacing the fastening points from each other. In this event, by adjusting the angle of the second fastening part 54 with respect to the first fastening part 53, the input directions of shear loads to the shaft portions 61b and 62b of the fasteners 61 and 62 can be made to differ from each other more reliably. Further, since the fastening parts 53 and 54 are formed continuous with each other, one of the fastening parts functions as a reinforcing rib for the other fastening part, so that the strength of the fastening portions 51 and 52 can be further improved. In addition, the strength of the frame portion 7F can be further improved by the second fastening seats 31a and 31b that are provided in the rising manner. In this event, since the upper surface, to be inserted with the fasteners 61 and 62, of each of the second fastening seats 31a and 31b rises from the skeleton portion at the obtuse angle θ2, the strength of the frame portion 7F can be further improved while suitably ensuring the workspace for the insertion operation of the fasteners 61 and 62. By matching the positional relationships of the fasteners 61 and 62 with respect to the frame portion 7F (the shortest distances L5 and L6), the fastening force in the first fastening part 53 and the fastening force in the second fastening part 54 can be balanced with each other. Therefore, according to this embodiment, the seat back 6 and the bracket member 7 can be fastened and fixed to each other more firmly without excessively increasing the number of the fastening points or excessively spacing the fastening points from each other.

The vehicle structure body of the disclosure is not limited to the embodiment described above, and may alternatively be one of various other embodiments. In this embodiment, while the configurations (shape, size, position, number, etc.) of the fastening portions 51 and 52 have been described by way of example, this is not intended to limit the configurations of the fastening portions. For example, one or a plurality of fastening portions can be provided at appropriate positions of the seat back and the bracket member. Further, while the pair of fastening portions are provided symmetrically, they may alternatively be provided asymmetrically. Further, it is satisfactory if at least one of the first fastening seat and the second fastening seat is configured to rise from a corresponding skeleton portion, and the first fastening seat may be provided to rise from the seat frame. The fasteners can be inserted from the first fastening seat side, and in this case, it is desirable that the surface, to be inserted with the fasteners, of the first fastening seat rise at an obtuse angle with respect to the seat frame. As long as the workspace can be ensured, it may be configured that the surface, to be inserted with the fasteners, of the fastening seat rises at a right angle or an acute angle with respect to the skeleton portion. At the surface, to be inserted with the fasteners, of the fastening seat, the shortest distance from the axis of the first fastener to the skeleton portion and the shortest distance from the axis of the second fastener to the skeleton portion may be different from each other. The second fastening seat may be provided with a part that can be fastened and fixed to the auxiliary fastening seat of the first fastening seat.

In this embodiment, while the configurations (shape, size, position, positional relationship, etc.) of the first fastening part 53 and the second fastening part 54 have been described by way of example, this is not intended to limit the configurations of the fastening parts. For example, by providing a slit, an elongated hole, a cut-out, or the like between the first fastening part and the second fastening part, the first and second fastening parts can be provided adjacent to each other in a divided state. The numerical value of the angle θ1 of the second fastening part with respect to the first fastening part can be changed as appropriate. Further, the first fastening part can be disposed at a front, rear, right, or left position or an oblique position with respect to the second fastening part.

In this embodiment, while the fastening configurations of the fasteners 61 and 62 and the first and second fastening parts 53 and 54 have been described by way of example, this is not intended to limit these fastening configurations. For example, while omitting the bushes and nuts, the fasteners can be directly screwed into threaded insertion holes provided to the corresponding fastening parts. The configurations of the first fastener and the second fastener can be changed as appropriate and may be the same as each other or different from each other.

In this embodiment, while the vehicle seat 2 has been described as the vehicle structure body by way of example, the seat back 6 has been described as the vehicle interior member by way of example, and the bracket member 7 has been described as the exterior member by way of example, this is not intended to limit the types of vehicle structure body, vehicle interior member, and exterior member. For example, various members disposed in a vehicle compartment can be supposed to be vehicle structure bodies, and a vehicle interior member and an exterior member can be set according to the type of vehicle structure body. The configuration of the vehicle seat 2 as the vehicle structure body can also be changed as appropriate, and constituent members of the vehicle seat can be used as a vehicle interior member and an exterior member. The configuration of this embodiment can be applied to vehicle structure bodies such as various vehicle seats that are mounted in vehicles such as cars, airplanes, and trains.

What is claimed is:

1. A vehicle structure body comprising:
a vehicle interior member;
an exterior member that is disposed on an outer surface side of the vehicle interior member; and
a fastening portion in which a first fastening seat of the vehicle interior member and a second fastening seat of the exterior member are fastened and fixed to each other in a state of being disposed to face each other, wherein:
a first fastening part to which a first fastener is attached with a shaft portion of the first fastener being inserted through the first fastening part, and a second fastening part to which a second fastener is attached with a shaft portion of the second fastener being inserted through the second fastening part are provided adjacent to each other in the fastening portion; and an input direction of a shear load that is applied to the shaft portion of the first fastener in an orthogonal direction and an input direction of a shear load that is applied to the shaft portion of the second fastener in an orthogonal direction differ from each other.

2. The vehicle structure body according to claim 1, wherein the second fastening part is inclined to the first fastening part.

3. The vehicle structure body according to claim 1, wherein the first fastening part and the second fastening part are continuous with each other.

4. The vehicle structure body according to claim 1, wherein at least one of the first fastening seat and the second fastening seat is provided in a state of rising from a skeleton portion of the vehicle structure body.

5. The vehicle structure body according to claim 4, wherein one of the first fastening seat and the second fastening seat is disposed on a side to be inserted with the first fastener and the second fastener, and a surface, to be inserted with the first fastener and the second fastener, of the one of the first fastening seat and the second fastening seat rises at an obtuse angle with respect to the skeleton portion.

6. The vehicle structure body according to claim 4, wherein one of the first fastening seat and the second fastening seat is disposed on a side to be inserted with the first fastener and the second fastener, and at a surface, to be inserted with the first fastener and the second fastener, of the one of the first fastening seat and the second fastening seat, a shortest distance from an axis of the first fastener to the skeleton portion and a shortest distance from an axis of the second fastener to the skeleton portion are substantially equal to each other.

* * * * *